US012054623B2

United States Patent
Takarada et al.

(10) Patent No.: US 12,054,623 B2
(45) Date of Patent: Aug. 6, 2024

(54) IMAGE FORMING METHOD, SET OF PROCESSING FLUID AND INK, AND IMAGE FORMING APPARATUS

(71) Applicants: Tatsuya Takarada, Kanagawa (JP); Yuusuke Koizuka, Shizuoka (JP); Naoto Shimura, Tokyo (JP); Nozomi Terai, Tokyo (JP); Yuya Hirokawa, Kanagawa (JP)

(72) Inventors: Tatsuya Takarada, Kanagawa (JP); Yuusuke Koizuka, Shizuoka (JP); Naoto Shimura, Tokyo (JP); Nozomi Terai, Tokyo (JP); Yuya Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 112 days.

(21) Appl. No.: 17/810,374

(22) Filed: Jul. 1, 2022

(65) Prior Publication Data

US 2023/0012907 A1 Jan. 19, 2023

(30) Foreign Application Priority Data

Jul. 14, 2021 (JP) .................................. 2021-116112

(51) Int. Cl.
*C09D 11/32* (2014.01)
*C09D 11/36* (2014.01)
*C09D 11/38* (2014.01)

(52) U.S. Cl.
CPC .............. *C09D 11/32* (2013.01); *C09D 11/36* (2013.01); *C09D 11/38* (2013.01)

(58) Field of Classification Search
CPC ......... C09D 11/32; C09D 11/36; C09D 11/38; C09D 11/102; C09D 11/106;
(Continued)

(56) References Cited

U.S. PATENT DOCUMENTS

2012/0314000 A1 12/2012 Sarkisian et al.
2014/0267516 A1 9/2014 Nonogaki et al.
(Continued)

FOREIGN PATENT DOCUMENTS

JP 2018-154118 10/2018
JP 2018-165417 10/2018
(Continued)

OTHER PUBLICATIONS

European Search Report dated Dec. 15, 2022, in European Application No. 22181799.2, 8 pages.
(Continued)

*Primary Examiner* — Lisa Solomon
(74) *Attorney, Agent, or Firm* — Grüneberg and Myers PLLC (57) ABSTRACT

An image forming method includes a processing fluid applying step and an ink applying step. The processing fluid applying step involves applying a processing fluid containing a multivalent metal salt, a resin $T_A$, a resin $T_B$ different from the resin $T_A$, and a silicone-based surfactant to a non-permeating base material by an inkjet method, where the processing fluid is free of an organic solvent having a boiling point of 200° C. or higher at normal pressure. The ink applying step involves applying an ink containing a coloring material, an organic solvent, and a resin onto the processing fluid.

5 Claims, 2 Drawing Sheets (58) Field of Classification Search
CPC ....... C09D 11/322; C09D 11/40; C09D 11/54; B41J 2/165; B41J 2/2114; B41M 5/0047; B41M 5/0064; B41M 5/0017
See application file for complete search history.

(56) References Cited

U.S. PATENT DOCUMENTS

| | | |
|---|---|---|
| 2016/0168292 A1 | 6/2016 | Fukuoka et al. |
| 2017/0355868 A1 | 12/2017 | Saiga et al. |
| 2018/0208783 A1 | 7/2018 | Takahashi et al. |
| 2018/0265728 A1 | 9/2018 | Hanazawa et al. |
| 2019/0092956 A1 | 3/2019 | Imanaga et al. |
| 2019/0389231 A1* | 12/2019 | Kaji ............... C09D 11/54 |
| 2020/0016898 A1 | 1/2020 | Sagara et al. |
| 2020/0391533 A1 | 12/2020 | Gotou |
| 2021/0062026 A1 | 3/2021 | Shimura et al. |
| 2021/0155012 A1 | 5/2021 | Gotou et al. |
| 2021/0363369 A1 | 11/2021 | Akima et al. |
| 2022/0024217 A1 | 1/2022 | Sakaguchi et al. |
| 2022/0056298 A1 | 2/2022 | Umemura et al. |
| 2022/0056299 A1 | 2/2022 | Yamamoto et al. |
| 2022/0118774 A1 | 4/2022 | Saiga et al. |
| 2022/0118786 A1 | 4/2022 | Takarada et al. |
| 2022/0119664 A1 | 4/2022 | Koizuka et al. |
| 2022/0126605 A1 | 4/2022 | Saiga et al. |
| 2022/0169034 A1 | 6/2022 | Hagiwara et al. |
| 2022/0177718 A1 | 6/2022 | Umemura et al. |

FOREIGN PATENT DOCUMENTS

| | | |
|---|---|---|
| JP | 2019-064250 | 4/2019 |
| JP | 2019-163349 | 9/2019 |
| JP | 2021-091765 | 6/2021 |

OTHER PUBLICATIONS

U.S. Appl. No. 17/641,758, filed Jul. 1, 2020, Naoto Shimura, et al.

* cited by examiner

IMAGE FORMING METHOD, SET OF PROCESSING FLUID AND INK, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2021-116112, filed on Jul. 14, 2021, in the Japan Patent Office, the entire disclosure of which is hereby incorporated by reference herein.

BACKGROUND

Technical Field

The present disclosure relates to an image forming method, a set of a processing fluid and an ink, and an image forming apparatus.

Description of the Related Art

In recent years, commercial printing and industrial printing fields, in which analog printing techniques such as offset printing and flexographic printing have been the mainstream, also have increasing needs for inkjet printers as a digital printing means that can print various kinds of designs in small lots without plates.

Main print items of commercial printing are, for example, pamphlets, catalogues, posters, and manuals. Main print items of industrial printing include labels, packages, textiles, and cardboard. Particularly in the industrial printing fields, various kinds of designs in small lots are preferred and used for product sales promotion.

When producing various kinds of printed matters in small lots by digital printing, various kinds of printing base materials are used. Different printing base materials have different surface properties, some of which may influence the quality of the printed matters.

Here, it is known to apply a pre-processing fluid for increasing an ink receiving property to base materials before applying inks, in order to produce printed matters of the same quality on various kinds of base materials. The pre-processing fluid is required to improve not only the appearance of the printed matters but also the adhesiveness of images on the printing base materials, and to have discharging stability itself.

SUMMARY

According to an aspect of the present disclosure, an image forming method includes applying a processing fluid containing a multivalent metal salt, a resin $T_A$, a resin $T_B$ different from the resin $T_A$, and a silicone-based surfactant to a non-permeating base material by an inkjet method, the processing fluid being free of an organic solvent having a boiling point of 200° C. or higher at normal pressure, and applying an ink containing a coloring material, an organic solvent, and a resin onto the processing fluid.

According to an aspect of the present disclosure, a set of a processing fluid and an ink includes: a processing fluid containing a multivalent metal salt, a resin $T_A$, a resin $T_B$ different from the resin $T_A$, and a silicone-based surfactant, the processing fluid being free of an organic solvent having a boiling point of 200° C. or higher; and an ink containing a coloring material, an organic solvent, and a resin.

According to an aspect of the present disclosure, an image forming apparatus includes: a processing fluid storage a processing fluid containing a multivalent metal salt, a resin $T_A$, a resin $T_B$ different from the resin $T_A$, and a silicone-based surfactant, the processing fluid being free of an organic solvent having a boiling point of 200° C. or higher at normal pressure; a processing fluid applying unit configured to apply the processing fluid stored in the processing fluid storage to a non-permeating base material by an inkjet method; an ink storage storing an ink containing a coloring material, an organic solvent, and a resin; and an ink applying unit configured to apply the ink stored in the ink storage onto the processing fluid.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure can provide an image forming method that can form an image having an excellent adhesiveness with a non-permeating base material, using a processing fluid having an excellent discharging stability.

(Image Forming Method and Image Forming Apparatus)

An image forming method of the present disclosure includes a processing fluid applying step of applying a processing fluid containing a multivalent metal salt, a resin $T_A$, a resin $T_B$ different from the resin $T_A$, and a silicone-based surfactant to a non-permeating base material by an inkjet method, the processing fluid being free of an organic solvent having a boiling point of 200° C. or higher at normal pressure, and an ink applying step of applying an ink containing a coloring material, an organic solvent, and a resin onto the processing fluid, and further includes other steps as needed.

An image forming apparatus of the present disclosure includes a processing fluid storage storing a processing fluid containing a multivalent metal salt, a resin $T_A$, a resin $T_B$ different from the resin $T_A$, and a silicone-based surfactant, the processing fluid being free of an organic solvent having a boiling point of 200° C. or higher at normal pressure, a processing fluid applying unit configured to apply the processing fluid stored in the processing fluid storage to a non-permeating base material by an inkjet method, an ink storage storing an ink containing a coloring material, an organic solvent, and a resin, and an ink applying unit configured to apply the ink stored in the ink storage onto the processing fluid, and further includes other units as needed.

According to existing techniques, there is a problem that a formed image does not have a sufficient adhesiveness with a base material and may peel from the base material.

Moreover, when a resin is added in a pre-processing fluid in order to improve adhesiveness, there may occur a problem that the resin dries near nozzles and clogs the nozzles or destabilizes meniscus control, to degrade the discharging stability of the pre-processing fluid.

As a result of earnest studies, the inventors of the present invention have found that a processing fluid containing a multivalent metal salt, a resin $T_A$, a resin $T_B$ different from the resin $T_A$, and a silicone-based surfactant, but free of an organic solvent having a boiling point of 200° C. or higher at normal pressure can have an improved wettability on a non-permeating base material, can improve adhesiveness of an image with the base material, and can have an excellent discharging stability.

A multivalent metal salt added in the processing fluid flocculates the pigment contained in the ink at the same time as an ink droplet lands on a base material. This makes it possible to obtain a clear image without color bleed (suppression of image bleeding).

"Free of an organic solvent having a boiling point of 200° C. or higher at normal pressure" does not exclude a case where the processing fluid contains an organic solvent having a boiling point of 200° C. or higher at normal pressure as an impurity, and means that the content ratio of an organic solvent having a boiling point of 200° C. or higher at normal pressure is 1% by mass or less.

The processing fluid is applied to the non-permeating base material before the ink is applied. Therefore, the processing fluid may be referred to as pre-processing fluid.

<Processing Fluid Applying Step and Processing Fluid Applying Unit>

The processing fluid applying step is a step of applying a processing fluid to a non-permeating base material by an inkjet method.

The processing fluid applying unit is a unit configured to apply a processing fluid stored in a processing fluid storage storing the processing fluid to a non-permeating base material by an inkjet method. The processing fluid storage is not particularly limited, and, for example, a known inkjet cartridge can be used.

—Processing Fluid—

The processing fluid contains a multivalent metal salt, a resin $T_A$, a resin $T_B$ different from the resin $T_A$, and a silicone-based surfactant and may further contain water and an organic solvent, but is free of an organic solvent having a boiling point of 200° C. or higher at normal pressure.

The processing fluid can contain the same materials as used in an ink, such as an organic solvent, a surfactant, a defoaming agent, a pH regulator, a preservative and a fungicide, and a corrosion inhibitor. In addition, the processing fluid can contain materials used in known processing fluids.

The processing fluid can contain the same materials as used in an ink described below, such as an organic solvent and an antimicrobial agent. In addition, the processing fluid can contain materials used in known processing fluids. However, the processing fluid is free of an organic solvent having a boiling point of 200° C. or higher at normal pressure.

—Multivalent metal salt (flocculant)—

The multivalent metal salt functions as a flocculant.

The multivalent metal salt flocculates a pigment contained in a printing liquid quickly after a droplet of the liquid lands on a base material, and suppresses color bleed and improves color developability.

The multivalent metal salt is not particularly limited and may be appropriately selected depending on the intended purpose. For example, a divalent metal salt is preferable.

Examples of the divalent metal salt include, but are not limited to, calcium carbonate, calcium nitrate, calcium chloride, calcium acetate, calcium sulfate, magnesium chloride, magnesium acetate, and magnesium sulfate. One of these divalent metal salts may be used alone or two or more of these divalent metal salts may be used in combination.

The content of the multivalent metal salt is preferably 1% by mass or greater, more preferably 3% by mass or greater, and yet more preferably 6% by mass or greater relative to the total amount of the processing fluid. The upper limit of the content of the multivalent metal salt is not particularly limited and may be appropriately selected depending on the intended purpose.

—Resin $T_A$—

The resin $T_A$ is not particularly limited and may be appropriately selected depending on the intended purpose. Examples of the resin $T_A$ include, but are not limited to, urethane-based resins, polyester-based resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

It is preferable that the glass transition temperature $Tg_A$ of the resin $T_A$ satisfy $Tg_A \leq -15°$ C., and more preferably $-40°$ C. $\leq Tg_A -15°$ C.

When the processing fluid contains a resin having Tg of $-15°$ C. or lower and a silicone-based surfactant and is free of an organic solvent having a boiling point of 200° C. or higher, an ink wets and spreads immediately after a droplet of the ink lands on a non-permeating base material, and quickly forms a processing film. Hence, by applying the processing fluid of the present disclosure to a base material before applying an ink, it is possible to increase adhesiveness of an ink film with the base material.

The form of the resin $T_A$ is not particularly limited and may be appropriately selected depending on the intended purpose. Examples of the form of the resin $T_A$ include, but are not limited to, resin particles. It is possible to obtain the processing fluid by mixing the resin particles, which are in a state of a resin emulsion dispersed in water serving as a dispersion medium, with materials such as the multivalent metal salt and an organic solvent. As the resin particles, an appropriately synthesized product or a commercially available product may be used.

Examples of commercially available resin particles include, but are not limited to, HYDRAN WLI-611 (available from DIC Corporation, with $Tg_A$ of $-15°$ C.), SUPERFLEX E2000 (available from DKS Co., Ltd., with $Tg_A$ of $-38°$ C.), SUPERFLEX 500M (available from DKS Co., Ltd., with $Tg_A$ of $-39°$ C.), VINYBLAN 1245L (available from Nissin Chemical Co., Ltd., with $Tg_A$ of −13° C.), and VINYBLAN 4003 (available from Nissin Chemical Co., Ltd., with $Tg_A$ of −15° C.).

The volume average particle diameter of the resin particles is not particularly limited, may be appropriately selected depending on the intended purpose, and is preferably 10 nm or greater but 1,000 nm or less, more preferably 10 nm or greater but 200 nm or less, and particularly preferably 10 nm or greater but 100 nm or less in terms of obtaining a good adhesiveness and a high image hardness.

The volume average particle diameter can be measured with, for example, a particle size analyzer (NANOTRAC WAVE-UT151, available from MicrotracBel Corporation).

The content of the resin $T_A$ is not particularly limited, may be appropriately selected depending on the intended purpose, and is preferably 1% by mass or greater but 30% by mass or less and more preferably 5% by mass or greater but 20% by mass or less relative to the total amount of the processing fluid in terms of adhesiveness of an image to be formed, and storage stability of the processing fluid.

—Resin $T_B$—

The resin $T_B$ is not particularly limited and may be appropriately selected depending on the intended purpose so long as the resin $T_B$ is a resin of a different kind from the resin $T_A$ contained in the same processing fluid. Examples of the resin $T_B$ include, but are not limited to, urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins.

It is preferable that the glass transition temperature $Tg_B$ of the resin $T_B$ satisfy 30° C.$\leq Tg_B$, and more preferably 30° C.$\leq Tg_B \leq$50° C. The processing fluid also containing a resin having Tg of 30° C. or higher can improve adhesiveness while securing discharging stability.

The form of the resin $T_B$ is not particularly limited and may be appropriately selected depending on the intended purpose. Examples of the form of the resin $T_B$ include, but are not limited to, resin particles. It is possible to obtain the processing fluid by mixing the resin particles, which are in a state of a resin emulsion dispersed in water serving as a dispersion medium, with materials such as the multivalent metal salt and an organic solvent. As the resin particles, an appropriately synthesized product or a commercially available product may be used.

Examples of commercially available resin particles include, but are not limited to, UW-550CS (available from Taisei Fine Chemical Co., Ltd. (core-shell acrylic resin), with $Tg_B$ of 40° C.), VINYBLAN 1008 (available from Nissin Chemical Co., Ltd., with $Tg_B$ of 30° C.), and VINYBLAN GV-6181 (available from Nissin Chemical Co., Ltd., with Tgs of 30° C.), and VINYBLAN 1017-AD (available from Nissin Chemical Co., Ltd., with $Tg_B$ of 31° C.).

The volume average particle diameter can be measured with, for example, a particle size analyzer (NANOTRAC WAVE-UT151, available from MicrotracBel Corporation).

The content of the resin $T_B$ is not particularly limited, may be appropriately selected depending on the intended purpose, and is preferably 1% by mass or greater but 30% by mass or less and more preferably 5% by mass or greater but 20% by mass or less relative to the total amount of the processing fluid in terms of adhesiveness of an image to be formed, and storage stability of the processing fluid.

—Silicone-Based Surfactant—

The silicone-based surfactant has no specific limit and can be suitably selected to suit to a particular application. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A polyether-modified silicone-based surfactant having a polyoxyethylene group or a polyoxyethylene polyoxypropylene group as a modifying group is particularly preferable because such an agent demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd. NIHON EMULSION Co., Ltd., Kyoeisha Chemical Co., Ltd., etc.

The polyether-modified silicone-containing surfactant has no particular limit and can be suitably selected to suit to a particular application. Examples thereof include, but are not limited to, a compound in which the polyalkylene oxide structure represented by the following general formula (S-1) is introduced into the side chain of the Si site of dimethyl polysiloxane.

General formula (S-1)

$X = -R(C_2H_4O)_a (C_3H_6O)_b R'$

In the general formula (S-1), "m", "n", "a", and "b" each, respectively represent integers, R represents an alkylene group, and R' represents an alkyl group.

Products available on the market may be used as the polyether-modified silicone-based surfactants. Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.). FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), TSF4440, TSF4452, and TSF4453 (all manufactured by Toshiba Silicone Co., Ltd.), WET-270 (manufactured by Evonik Industries AG), and SAG503A (manufactured by Nissin Chemical Co., Ltd.).

The proportion of the surfactant in the processing fluid is not particularly limited and can be suitably selected to suit to a particular application. It is preferably from 0.001 to 5 percent by mass and more preferably from 0.05 to 5 percent by mass in terms of excellent wettability and discharging stability and improvement on image quality.

—Other Components—

The other components are not particularly limited and may be appropriately selected depending on the intended purpose.

The non-permeating base material, which is a recording medium used in the present disclosure, has a surface with low moisture permeability and absorbency and includes a material having myriad of hollow spaces inside but not open to the outside. To be more quantitative, the base material has a water-absorption amount of 10 mL % m² or less between the contact and 30 msec$^{1/2}$ m after the contact according to Bristow method.

For example, polyvinyl chloride resin films, polyethylene terephthalate (PET) films, polypropylene, polyethylene, polycarbonate films, and nylon films are suitably used for the non-permeating base material.

Examples of the polypropylene films include, but are not limited to, P-2002, P-2161, and P-4166 available from Toyobo Co., Ltd.; PA-20, PA-30, and PA-20W available from SUNTOX Co., Ltd.; and FOA, FOS, and FOR available from Futamura Chemical Co., Ltd.

Examples of the polyethylene terephthalate films include, but are not limited to, E-5100 and E-5102 available from Toyobo Co., Ltd.; P60 and P375 available from Toray Industries, Inc.; and G2, G2P2, K, and SL available from Teijin DuPont Films Ltd.

Examples of the nylon films include, but are not limited to, HARDEN FILM N-1100, N-1102, and N-1200 available from Toyobo Co., Ltd.; and ON, NX, MS, and NK available from Unitika Ltd.

<Ink Applying Step and Ink Applying Unit>

The ink applying step is a step of applying an ink onto the processing fluid.

The ink applying unit is a unit configured to apply an ink stored in an ink storage storing an ink containing a coloring material, an organic solvent, and a resin onto the processing fluid. The ink storage is not particularly limited and may be appropriately selected depending on the intended purpose.

—Ink—

The organic solvent, water, coloring material, resin, and additives for use in the ink are described next.

—Organic Solvent—

There is no specific limitation on the type of the organic solvent used in the present disclosure. For example, water-soluble organic solvents are suitable. Specific examples thereof include, but are not limited to, polyols, ethers such as polyol alkylethers and polyol arylethers, nitrogen-containing heterocyclic compounds, amides, amines, and sulfur-containing compounds.

Specific examples of the water-soluble organic solvents include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butvrolactone; amides such as formamide, N-methylformamide. N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

Since the water-soluble organic solvent serves as a humectant and also imparts a good drying property, it is preferable to use an organic solvent having a boiling point of 250° C. or lower.

Polyol compounds having eight or more carbon atoms and glycol ether compounds are also suitable. Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkylethers such as ethyleneglycol monoethylether, ethyleneglycol monobutylether, diethylene glycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyol compounds having eight or more carbon atoms and glycolether compounds enhance the permeability of ink when paper is used as a print medium.

The proportion of the organic solvent in ink has no particular limit and can be suitably selected to suit a particular application. In terms of the drying property and discharging reliability of the ink, the proportion is preferably from 10 to 60 percent by mass and more preferably from 20 to 60 percent by mass.

—Coloring Material—

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The proportion of the coloring material in ink is preferably from 0.1 to 15 percent by mass and more preferably from 1 to 10 percent by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

[Pigment Dispersion]

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle size. It is good to use a dispersing device for dispersion.

The particle diameter of the pigment in the pigment dispersion has no particular limit. For example, the maximum frequency in the maximum number conversion is preferably from 20 to 500 nm and more preferably from 20 to 150 nm to improve dispersion stability of the pigment and ameliorate the discharging stability and image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the content is preferably from 0.1 to 50 percent by mass and more preferably from 0.1 to 30 percent by mass.

During the production, coarse particles are optionally filtered off from the pigment dispersion with a filter, a centrifuge, etc. preferably followed by degassing.

—Resin—

The type of the resin contained in the ink has no particular limit and can be suitably selected to suit to a particular application. Specific examples thereof include, but are not limited to, urethane resins, polyester resins, acrylic-based resins, vinyl acetate-based resins, styrene-based resins, butadiene-based resins, styrene-butadiene-based resins, vinyl-chloride-based resins, acrylic styrene-based resins, and acrylic silicone-based resins.

Particles of such resins may be also used. It is possible to mix a resin emulsion in which the resin particles are dispersed in water serving as a dispersion medium with materials such as a coloring agent and an organic solvent to obtain ink. The resin particle can be synthesized or is available on the market. It is possible to synthesize the resin particle or obtain from market. These can be used alone or in combination of the resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image hardness.

The volume average particle diameter can be measured by using a particle size analyzer (Nanotrac Wave-UT151, manufactured by MicrotracBEL Corp.).

The proportion of the resin is not particularly limited and can be suitably selected to suit to a particular application. In terms of fixability and storage stability of ink, it is preferably from 1 to 30 percent by mass and more preferably from 5 to 20 percent by mass to the total content of the ink.

—Water—

The proportion of water in the ink has no particular limit and can be suitably selected to suit to a particular application. In terms of the drying property and discharging reliability of the ink, the proportion is preferably from 10 to 90 percent by mass and more preferably from 20 to 60 percent by mass.

The particle diameter of the solid portion in ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particles, particles of pigments, etc. The particle diameter of the solid portion can be measured by using a particle size analyzer (Nanotrac Wave-UT151, manufactured by MicrotracBEL Corp).

—Additive—

Ink may further optionally contain a surfactant, a defoaming agent, a preservative and fungicide, a corrosion inhibitor, a pH regulator, etc.

—Surfactant—

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These are particularly preferable because they do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxy ethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-containing surfactant has no particular limit and can be suitably selected to suit to a particular application. Examples thereof include, but are not limited to, a compound in which the polyalkylene oxide structure represented by the following general formula (S-1) is introduced into the side chain of the Si site of dimethyl polysiloxane.

General formula (S-1)

In the general formula (S-1), "m", "n", "a", and "b" each, respectively represent integers, R represents an alkylene group, and R' represents an alkyl group.

Products available on the market may be used as the polyether-modified silicone-based surfactants. Specific examples of polyether-modified silicone-based surfactants include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

The proportion of the surfactant in ink is not particularly limited and can be suitably selected to suit to a particular application. It is preferably from 0.001 to 5 percent by mass and more preferably from 0.05 to 5 percent by mass in terms of excellent wettability and discharging stability and improvement on image quality.

—Defoaming Agent—

The defoaming agent has no particular limit. For example, silicone-based defoaming agents, polyether-based defoaming agents, and aliphatic acid ester-based defoaming agents are suitable. These can be used alone or in combination. Of these, silicone-based defoaming agents are preferable to easily break foams.

—Preservatives and Fungicides—

The preservatives and fungicides are not particularly limited. A specific example is 1,2-benzisothiazolin-3-on.

—Corrosion Inhibitor—

The corrosion inhibitor has no particular limit. Examples thereof are acid sulfite and sodium thiosulfate.

—pH Regulator—

The pH regulator has no particular limit. It is preferable to adjust the pH to 7 or higher. Specific examples thereof include, but are not limited to, amines such as diethanol amine and triethanol amine.

The property of the ink is not particularly limited and can be suitably selected to suit to a particular application. For example, viscosity, surface tension, pH, etc., are preferably in the following ranges.

The viscosity of the ink at 25° C. is preferably from 5 to 30 mPa·s and more preferably from 5 to 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1° 34×R24)
Sample liquid amount: 1.2 mL
Number of rotations: 50 rotations per minute (rpm)
25° C.
Measuring time: three minutes The surface tension of the ink is preferably 35 mN/m or less and more preferably 32 mN/m or less at 25° C. in terms that the ink is suitably levelized on a print medium and the drying time of the ink is shortened. The pH of the ink is preferably from 7 to 12 and more preferably from 8 to 11 in terms of prevention of corrosion of metal materials contacting the ink.

<Other Steps>

The other steps are not particularly limited and may be appropriately selected depending on the intended purpose.

[Printed Matter]

The printed matter of the present disclosure includes a print medium and an image formed on the print medium with the ink of the present disclosure.

An inkjet printing device and an inkjet printing method are used to print the image on the print medium to obtain the printed matter.

[Printing Device and Printing Method]

The ink of the present disclosure can be suitably applied to various printing devices employing an inkjet printing method such as printers, facsimile machines, photocopiers, multifunction peripherals (serving as a printer, a facsimile machine, and a photocopier), and 3D model manufacturing devices (3D printers, additive manufacturing device).

In the present disclosure, the printing device and the printing method represent a device capable of discharging ink, various processing fluids, etc. to a print medium and a method printing an image on the print medium using the device. The print medium means an article to which the ink or the various processing fluids can be attached at least temporarily.

The printing device may further optionally include a device relating to feeding, conveying, and ejecting the print medium and other devices referred to as a pre-processing device, a post-processing device, etc. in addition to the head portion to discharge the ink.

The printing device and the printing method may further optionally include a heater for use in the heating process and a drier for use in the drying process. For example, the heating device and the drying device heat and dry the top surface and the bottom surface of a print medium having an image. The heating device and the drying device are not particularly limited. For example, a fan heater and an infra-red heater can be used. The print medium can be heated and dried before, during, and after printing.

In addition, the printing device and the printing method are not limited to those producing merely meaningful visible images such as texts and figures with the ink. For example, the printing device and the printing method can produce patterns like geometric design and 3D images.

In addition, the printing device includes both a serial type device in which the liquid discharging head is caused to move and a line type device in which the liquid discharging head is not moved, unless otherwise specified.

Furthermore, in addition to the desktop type, this printing device includes a wide type capable of printing images on a large print medium such as A0, a continuous printer capable of using continuous paper wound up in a roll form as print media.

Figure 1:
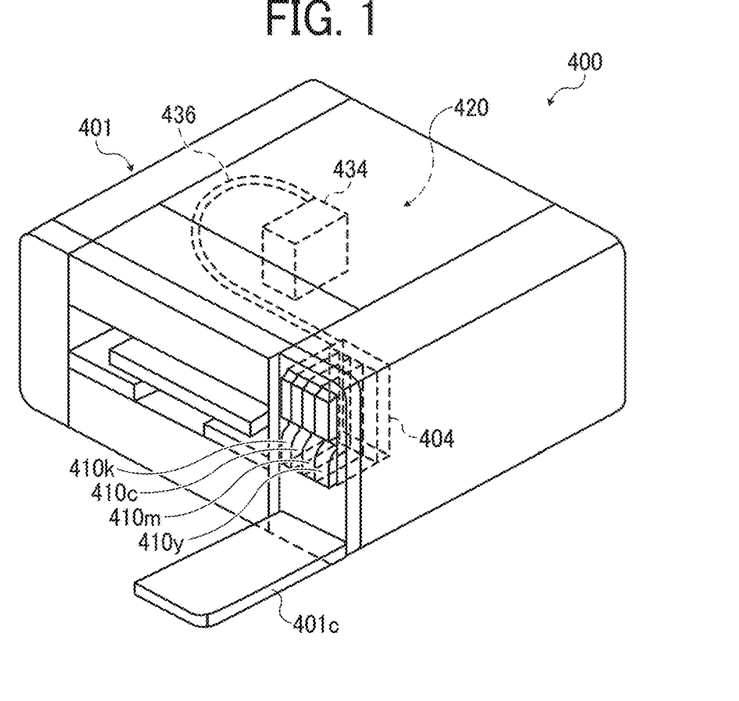
FIG. 1 is an oblique view of a printed matter producing apparatus of the present disclosure.
Figure 2:
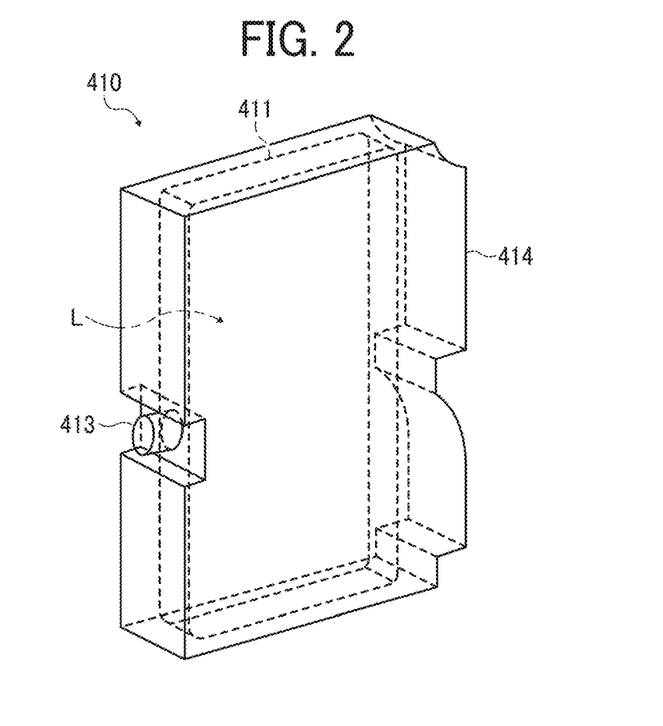
FIG. 2 is an oblique view of a main tank of a printed matter producing apparatus of the present disclosure.

The printing device of the present disclosure is described using an example with reference to FIG. 1 and FIG. 2. FIG. 1 is a perspective view of the image printing device. FIG. 2 is a perspective view of the main tank. An image forming apparatus 400 as an example of the printing device is a serial type image forming apparatus. A mechanical unit 420 is disposed in an exterior 401 of the image forming apparatus 400. Each ink accommodating unit (ink container) 411 of each main tank 410 (410k, 410c, 410m, and 410y) for each color of black (K), cyan (C), magenta (M), and yellow (Y) is made of a packing member L such as aluminum laminate film. The ink container 411 is accommodated in a plastic housing unit 414. As a result, the main tank 410 is used as an ink cartridge of each color.

A cartridge holder 404 is disposed on the rear side of the opening when a cover 401c of the main body is opened. The cartridge holder 404 is detachably attached to the main tank 410. As a result, each ink discharging outlet 413 of the main tank 410 is communicated with a discharging head 434 for each color via a supplying tube 436 for each color so that the ink can be discharged from the discharging head 434 to a print medium.

This printing device may include not only a portion discharging ink but also a device referred to as a pre-processing device, a post-processing device, etc.

As an example of the pre-processing device and the post-processing device, as in the case of the ink such as black (K), cyan (C), magenta (M), and yellow (Y), a liquid container containing a pre-processing fluid or a post-processing fluid and a liquid discharging head are added to discharge the pre-processing fluid or the post-processing fluid in an inkjet printing method.

As another example of the pre-processing device and the post-processing device, it is suitable to dispose a pre-processing device and a post-processing device employing a blade coating method, a roll coating method, or a spray coating method other than the inkjet printing method.

The method for applying the ink is not limited to an inkjet printing method, but a wide variety of methods can be used. In addition to the inkjet printing method, examples of the method for applying the ink include, but are not limited to, a blade coating method, a gravure coating method, a gravure offset coating method, a bar coating method, a roll coating method, a knife coating method, an air knife coating method, a comma coating method, a U-comma coating method, an AKKU coating method, a smoothing coating method, a microgravure coating method, a reverse roll coating method, a four-roll coating method, a five-roll coating method, a dip coating method, a curtain coating method, a slide coating method, and a die coating method.

Figure 3:
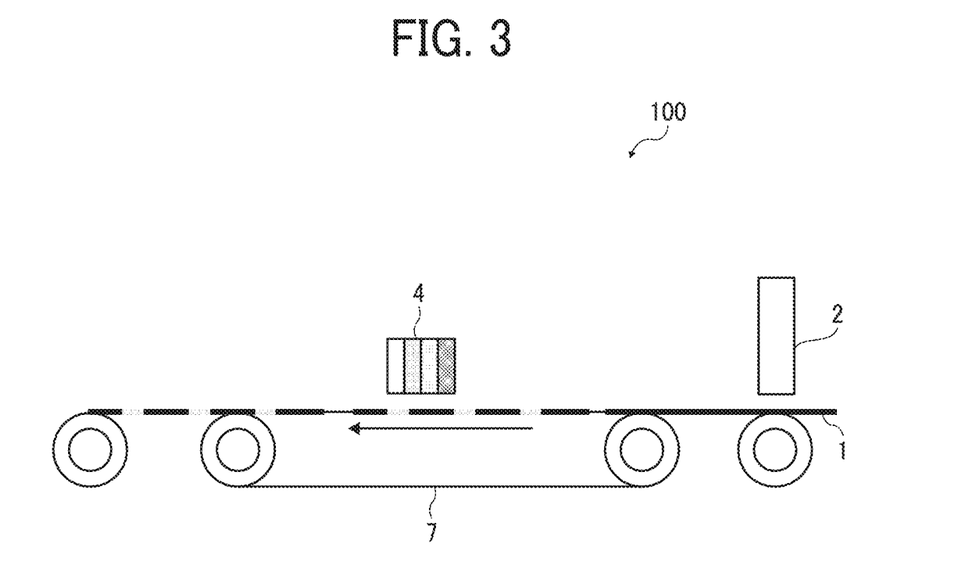
FIG. 3 is a schematic view of an image forming apparatus used in an image forming method of the present disclosure.

FIG. 3 is a schematic view of an image forming apparatus used in the image forming method of the present disclosure. An image forming apparatus 100 of FIG. 3 includes a unit configured to store and apply the processing fluid (i.e., a processing fluid applying device 2 serving as both the processing fluid storage and the processing fluid applying unit), a unit configured to store and discharge an ink (i.e., an ink discharging head 4 serving as both the ink storage and the ink applying unit), and a conveying belt 7.

(Set of Processing Fluid and Ink)

A set of a processing fluid and an ink of the present disclosure includes a processing fluid containing a multivalent metal salt, a resin $T_A$, a resin $T_B$ different from the resin $T_A$, and a silicone-based surfactant, the processing fluid being free of an organic solvent having a boiling point of 200° C. or higher, and an ink containing a coloring material, an organic solvent, and a resin, and further includes other members as needed.

The processing fluid and the ink of the set of a processing fluid and an ink of the present disclosure are the same as the processing fluid and the ink of the image forming method of the present disclosure.

(Printed Matter Producing Method)

A printed matter producing method of the present disclosure includes a processing fluid applying step of applying a processing fluid containing a multivalent metal salt, a resin $T_A$, a resin $T_B$ different from the resin $T_A$, and a silicone-based surfactant to a non-permeating base material by an inkjet method, the processing fluid being free of an organic solvent having a boiling point of 200° C. or higher at normal pressure, and an ink applying step of applying an ink containing a coloring material, an organic solvent, and a resin onto the processing fluid, and further includes other steps as needed.

The printed matter producing method of the present disclosure is the same as the image forming method of the present disclosure.

Moreover, image forming, recording, printing, etc. in the present disclosure represent the same meaning.

A print medium, a medium, and a printed matter represent the same meaning.

EXAMPLES

The present disclosure will be described below by way of Examples. The present disclosure should not be construed as being limited to these Examples. In Examples below, inks were prepared and evaluated at room temperature of 25° C. at a relative humidity of 60% RH unless otherwise particularly specified. Any value represented by "part" represents "part by mass", and any value represented by "%" represents "/o by mass" except for any values used in the evaluation criteria.

<Production of Cyan Pigment Dispersion (Dispersant Dispersing Type)>

A cyan pigment dispersion was obtained in the same manner as the method described in —Method A— in the section [Pigment surface reforming treatment] of JP-2012-207202-A.

Specifically, C.I. Pigment Blue 15:3 (product name: CHROMOFINE BLUE, obtained from Dainichiseika Color & Chemicals Mfg. Co., Ltd.) (20 g), a compound represented by Structural formula (5) below (20 mmol), and ion-exchanged water (200 mL) were mixed in a room temperature environment using a Silverson mixer (at 6,000 rpm (0.6% by mass)), to obtain a slurry.

If pH of the obtained slurry was higher than 4, nitric acid (20 mmol) would be added to the slurry. Thirty minutes later, sodium nitrite (20 mmol) dissolved in a small amount of ion-exchanged water was slowly added to the slurry.

While being stirred, the resultant was heated to 60° C. to react the materials for 1 hour. In this way, a reformed pigment in which the compound represented by Structural formula (5) below was added to the surface of the C.I. Pigment Blue 15:3 was obtained.

Next, the resultant was regulated to pH of 10 with a NaOH aqueous solution. As a result, a reformed pigment dispersion was obtained thirty minutes later. The reformed pigment dispersion and ion-exchanged water were subjected to ultra-filtration using a dialysis membrane, and further subjected to ultrasonic dispersion treatment, to obtain a cyan pigment dispersion (self-dispersible type) having a pigment concentration of 15% by mass and containing a bisphosphonic acid group as a hydrophilic functional group.

Structural formula (5)

<Production of Black Pigment Dispersion (Dispersant Dispersing Type)>

A black pigment dispersion having a pigment concentration of 15% by mass was produced in the same manner as the production of the cyan pigment dispersion, except that C.I. Pigment Blue 15:3 (20 g) used in the production of the cyan pigment dispersion was changed to carbon black (NIPEX160, obtained from Degussa AG) (20 g).

<Production of Magenta Pigment Dispersion (Dispersant Dispersing Type)>

A magenta pigment dispersion having a pigment concentration of 15% by mass was produced in the same manner as the production of the cyan pigment dispersion, except that C.I. Pigment Blue 15:3 (20 g) used in the production of the cyan pigment dispersion was changed to C.I. Pigment Red 122 (product name: TONER MAGENTA EO02, obtained from Clariant Japan K.K.) (20 g).

<Production of Yellow Pigment Dispersion (Dispersant Dispersing Type)>

A yellow pigment dispersion having a pigment concentration of 15% by mass was produced in the same manner as the production of the cyan pigment dispersion, except that C.I. Pigment Blue 15:3 (20 g) used in the production of the cyan pigment dispersion was changed to C.I. Pigment Yellow 74 (product name: FAST YELLOW 531, obtained from Dainichiseika Color & Chemicals Mfg. Co., Ltd.) (20 g).

(Resin Particle Preparation Example 1)

<Preparation of Polycarbonate-Based Urethane Resin Particle Liquid>

A reaction vessel into which a stirrer, a reflux condenser, and a thermometer were inserted was charged with polycarbonate diol (a reaction product (with a number average molecular weight (Mn) of 1,200) of 1,6-hexanediol and dimethyl carbonate) (1,500 g), 2,2-dimethylol propionic acid (hereinafter, may be referred to as "DMPA") (220 g), and N-methyl pyrrolidone (hereinafter, may be referred to as "NMP") (1,347 g) under a nitrogen airflow. The materials were heated to 60° C., to dissolve DMPA.

Next, 4,4'-dicyclohexylmethane diisocyanate (1.445 g) and dibutyl tin dilaurate (catalyst) (2.6 g) were added to the resultant, which was then heated to 90° C. to allow the materials to undergo a urethanation reaction for 5 hours, to obtain an isocyanate-terminated urethane prepolymer. This reaction mixture was cooled to 80° C., and triethylamine (149 g) was added and mixed with the resultant. From the mixture, 4,340 g was extracted and added to a mixture solution of water (5,400 g) and triethylamine (15 g) under strong stirring.

Next, ice (1,500 g), and then a 35% by mass 2-methyl-1,5-pentanediamine aqueous solution (626 g) were added to the resultant, to allow the materials to undergo a chain elongation reaction. The solvent was evaporated from the resultant in a manner that the solid concentration would be 40% by mass, to obtain a polycarbonate-based urethane resin particle liquid.

The resin glass transition temperature (hereinafter, may be referred to as "Tg") of the obtained polycarbonate-based urethane resin particle liquid was measured. As a result, Tg was −20° C.

(Resin Particle Preparation Example 2)

Preparation of Polyester-Based Urethane Resin Particle Liquid

A polyester-based urethane resin particle liquid having a solid concentration of 30% by mass was obtained in the same manner as in Resin particle preparation example 1, except that polyether polyol ("PTMG1000", obtained from Mitsubishi Chemical Corporation, with a weight average molecular weight of 1,000) used in Resin particle preparation example 1 was changed to polyester polyol ("POLYLITE OD-X-2251", obtained from DIC Corporation, with a weight average molecular weight of 2,000).

Tg of the obtained polyester-based urethane resin particle liquid measured in the same manner as in Resin particle preparation example 1 was 57° C.

(Preparation Example of Ink 1)

The black pigment dispersion liquid (with a pigment solid concentration of 15% by mass) (15% by mass), the polycarbonate-based urethane resin particle liquid of Resin particle preparation example 1 (with a solid concentration of 40% by mass) (25% by mass), the polyester-based urethane resin particle liquid of Preparation example 2 (with a solid concentration of 30% by mass) (15% by mass), 1,2-propanediol (obtained from Tokyo Chemical Industry Co., Ltd.) (23% by mass), 3-methoxy-3-methyl-1-butanol (obtained from Kuraray Co., Ltd.) (10% by mass), 2,3-butanediol (obtained from Tokyo Chemical Industry Co., Ltd.) (5% by mass), 2-ethylhexyl alcohol (obtained from Tokyo Chemical Industry Co., Ltd.) (3% by mass), a polyether-modified surfactant (product name: WET-270 obtained from TEGO GmbH) (1 % by mass), a preservative (product name: PROXEL LV (obtained from Arch Chemicals Japan, Inc.) (0.1% by mass), and highly pure water (balance) were added together, mixed and stirred, and filtrated through a polypropylene filter having an average pore diameter of 1.0 micrometer, to prepare an ink 1.

Preparation Examples of Inks 2 to 6

Inks 2 to 6 were prepared in the same manner as in Preparation example of Ink 1, to obtain the compositions presented in Table 1.

TABLE 1

| | | Ink No. | | | | | |
|---|---|---|---|---|---|---|---|
| | | 1 | 2 | 3 | 4 | 5 | 6 |
| Pigment dispersion | Black pigment dispersion (solid concentration: 15% by mass) | 15.00 | | | | | |
| | Cyan pigment dispersion (solid concentration: 15% by mass) | | 15.00 | 5.00 | | | |
| | Magenta pigment dispersion (solid concentration: 15% by mass) | | | | 15.00 | 5.00 | |
| | Yellow pigment dispersion (solid concentration: 15% by mass | | | | | | 15.00 |
| Organic solvent | 1,2-Propanediol (boiling point: 187° C.) | 23.00 | 23.00 | 28.00 | 24.00 | 28.00 | 23.00 |
| | 3-Methoxy-3-methyl-1-butanol (boiling point: 174° C.) | 10.00 | 10.00 | 10.00 | 10.00 | 10.00 | 10.00 |
| | 2,3-Butanediol (boiling point: 182° C.) | 5.00 | 5.00 | 5.00 | 5.00 | 5.00 | 5.00 |
| | 2-Ethylhexyl alcohol (boiling point: 184° C.) | 3.00 | 3.00 | 3.00 | 3.00 | 3.00 | 3.00 |
| Resin | Polycarbonate-based urethane resin particle liquid (Tg: −20° C., solid concentration: 40% by mass) | 25.00 | 25.00 | 25.00 | 25.00 | 25.00 | 25.00 |
| | Polyester-based urethane resin particle liquid (Tg: 57° C., solid concentration: 30% by mass) | 15.00 | 15.00 | 15.00 | 15.00 | 15.00 | 15.00 |
| Surfactant | WET-270 | 1.00 | 1.00 | 1.00 | 1.00 | 1.00 | 1.00 |
| Preservative | PROXEL LV | 0.10 | 0.10 | 0.10 | 0.10 | 0.10 | 0.10 |
| Water | Highly pure water | 2.90 | 2.90 | 7.90 | 1.90 | 7.90 | 2.90 |
| | Total | 100.00 | 100.00 | 100.00 | 100.00 | 100.00 | 100.00 |

Preparation Examples of Processing Fluids 1 to 18

Based on the compositions described in Tables 2 to 5, the materials were mixed by a known method, to prepare processing fluids 1 to 18.

TABLE 2

| | | Processing fluid No. | | | | |
|---|---|---|---|---|---|---|
| | | 1 | 2 | 3 | 4 | 5 |
| Multivalent metal salt | Calcium acetate | 1.00 | 1.00 | 1.00 | | |
| | Magnesium acetate | | | | 1.00 | 1.00 |
| | Aluminum silicate | | | | | |
| Resin | SUPERFLEX E2000 (Tg$_A$: −38° C., nonionic urethane resin) | 1.50 | | 1.50 | 1.50 | 1.50 |
| | VINYBLAN 4003 (Tg$_A$: −15° C., nonionic vinyl acetate resin) | | 1.50 | | | |
| | VINYBLAN GV-6181 (Tg$_B$: 30° C., nonionic vinyl acetate resin) | | | 5.50 | | |
| | UW-550CS (Tg$_B$: 40° C., core-shell cationic acrylic resin) | 5.50 | 5.50 | | 5.50 | 5.50 |
| | VINYBLAN 1225 (Tg: 9° C., nonionic vinyl acetate resin) | | | | | |
| Surfactant | WET-270 (silicone-based) | 1.00 | 1.00 | 1.00 | 1.00 | |
| | SAG503A (silicone-based) | | | | | 1.00 |
| | OLEFIN EXP.4300 (olefin-based) | | | | | |
| Solvent | 1,2-Propanediol (boiling point: 187° C.) | 10.00 | 10.00 | 10.00 | 10.00 | 10.00 |
| | 3-Methoxy-3-methyl-1-butanol (boiling point: 174° C.) | 30.00 | 30.00 | 30.00 | 30.00 | 30.00 |
| | Glycerin (boiling point: 290° C.) | | | | | |
| Preservative | PROXEL LV | 0.10 | 0.10 | 0.10 | 0.10 | 0.10 |
| Water | Highly pure water | 50.90 | 50.90 | 50.90 | 50.90 | 50.90 |
| | Total | 100.00 | 100.00 | 100.00 | 100.00 | 100.00 |

TABLE 3

| | | Processing fluid No. | | | | |
|---|---|---|---|---|---|---|
| | | 6 | 7 | 8 | 9 | 10 |
| Multivalent metal salt | Calcium acetate | 1.00 | 1.00 | 1.00 | 1.00 | 1.00 |
| | Magnesium acetate | | | | | |
| | Aluminum silicate | | | | | |
| Resin | SUPERFLEX E2000 (Tg$_A$: −38° C., nonionic urethane resin) | 1.00 | 2.50 | 1.50 | 1.00 | 2.50 |
| | VINYBLAN 4003 (Tg$_A$: −15° C., nonionic vinyl acetate resin) | | | | | |
| | VINYBLAN GV-6181 (Tg$_B$: 30° C., nonionic vinyl acetate resin) | | | | | |
| | UW-550CS (Tg$_B$: 40° C., core-shell cationic acrylic resin) | 6.00 | 4.50 | | | |
| | VINYBLAN 1225 (Tg: 9° C., nonionic vinyl acetate resin) | | | 5.50 | 6.00 | 4.50 |
| Surfactant | WET-270 (silicone-based) | 1.00 | 1.00 | 1.00 | 1.00 | 1.00 |
| | SAGS03A (silicone-based) | | | | | |
| | OLEFIN EXP.4300 (olefin-based) | | | | | |
| Solvent | 1,2-Propanediol (boiling point: 187° C.) | 10.00 | 10.00 | 10.00 | 10.00 | 10.00 |
| | 3-Methoxy-3-methyl-1-butanol (boiling point: 174° C.) | 30.00 | 30.00 | 30.00 | 30.00 | 30.00 |
| | Glycerin (boiling point: 290° C.) | | | | | |
| Preservative | PROXEL LV | 0.10 | 0.10 | 0.10 | 0.10 | 0.10 |
| Water | Highly pure water | 50.90 | 50.90 | 50.90 | 50.90 | 50.90 |
| | Total | 100.00 | 100.00 | 100.00 | 100.00 | 100.00 |

TABLE 4

| | | Processing fluid No. | | | | |
|---|---|---|---|---|---|---|
| | | 11 | 12 | 13 | 14 | 15 |
| Multivalent metal salt | Calcium acetate | | | 1.00 | 1.00 | 1.00 |
| | Magnesium acetate | | | | | |
| | Aluminum silicate | 1.00 | 1.00 | | | |

TABLE 4-continued

| | | Processing fluid No. | | | | |
|---|---|---|---|---|---|---|
| | | 11 | 12 | 13 | 14 | 15 |
| Resin | SUPERFLEX E2000 ($Tg_A$: −38° C., nonionic urethane resin) | 1.50 | 1.50 | 1.50 | 1.50 | 7.00 |
| | VINYBLAN 4003 ($Tg_A$: −15° C., nonionic vinyl acetate resin) | | | | | |
| | VINYBLAN GV-6181 ($Tg_B$: 30° C., nonionic vinyl acetate resin) | | | | | |
| | UW-550CS ($Tg_B$: 40° C., core-shell cationic acrylic resin) | 5.50 | | 5.50 | 5.50 | |
| | VINYBLAN 1225 (Tg: 9° C., nonionic vinyl acetate resin) | | 5.50 | | | |
| Surfactant | WET-270 (silicone-based) | 1.00 | 1.00 | 1.00 | | 1.00 |
| | SAG503A (silicone-based) | | | | | |
| | OLEFIN EXP.4300 (olefin-based) | | | | 1.00 | |
| Solvent | 1,2-Propanediol (boiling point: 187° C.) | 10.00 | 10.00 | 10.00 | 10.00 | 10.00 |
| | 3-Methoxy-3-methyl-1-butanol (boiling point: 174° C.) | 30.00 | 30.00 | 20.00 | 30.00 | 30.00 |
| | Glycerin (boiling point: 290° C.) | | | 10.00 | | |
| Preservative | PROXEL LV | 0.10 | 0.10 | 0.10 | 0.10 | 0.10 |
| Water | Highly pure water | 50.90 | 50.90 | 50.90 | 50.90 | 50.90 |
| | Total | 100.00 | 100.00 | 100.00 | 100.00 | 100.00 |

TABLE 5

| | | Processing fluid No. | | |
|---|---|---|---|---|
| | | 16 | 17 | 18 |
| Multivalent metal salt | Calcium acetate | 1.00 | 1.00 | 1.00 |
| | Magnesium acetate | | | |
| | Aluminum silicate | | | |
| Resin | SUPERFLEX E2000 ($Tg_A$: −38° C., nonionic urethane resin) | | 4.00 | |
| | VINYBLAN 4003 ($Tg_A$: −15° C., nonionic vinyl acetate resin) | | | |
| | VINYBLAN GV-6181 ($Tg_B$: 30° C., nonionic vinyl acetate resin) | | | |
| | UW-550CS ($Tg_B$: 40° C., core-shell cationic acrylic resin) | 7.00 | | 4.00 |
| | VINYBLAN 1225 (Tg: 9° C., nonionic vinyl acetate resin) | | | |
| Surfactant | WET-270 (silicone-based) | 1.00 | 1.00 | 1.00 |
| | SAGS03A (silicone-based) | | | |
| | OLEFIN EXP.4300 (olefin-based) | | | |
| Solvent | 1,2-Propanediol (boiling point: 187° C.) | 10.00 | 14.00 | 14.00 |
| | 3-Methoxy-3-methyl-1-butanol (boiling point: 174° C.) | 30.00 | 30.00 | 30.00 |
| | Glycerin (boiling point: 290° C.) | | | |
| Preservative | PROXEL LV | 0.10 | 0.10 | 0.10 |
| Water | Highly pure water | 50.90 | 49.90 | 49.90 |
| | Total | 100.00 | 100.00 | 100.00 |

The details of the components presented in Table 2 to Table 5 are as follows.

[Multivalent Metal Salt]
  Calcium acetate: obtained from Nacalai Tesque, Inc.
  Magnesium acetate: obtained from Nacalai Tesque, Inc.
  —Aluminum silicate: obtained from FUJIFILM Wako Pure Chemical Corporation

[Resin]
  Nonionic urethane resin: SUPERFLEX E2000, obtained from Daiichi Kogyo Co., Ltd. with a volume average particle diameter of 700 nm, a solid concentration of 50%, and Tg of 38° C.
  Nonionic vinyl acetate resin: VINYBLAN 4003, obtained from Nissin Chemical Co., Ltd., with a solid concentration of 50% and Tg of −15° C.
  Nonionic vinyl acetate resin: VINYLBLAN GV-6181, obtained from Nissin Chemical Co., Ltd., with a solid concentration of 50% and Tg of 30° C.
  Nonionic vinyl acetate resin: VINYBLAN 1225, obtained from Nissin Chemical Co., Ltd., with a solid concentration of 45% and Tg of 9° C.
  Core-shell cationic acrylic resin: UW-550CS, obtained from Taisei Fine Chemical Co., Ltd., with a solid concentration of 34% and Tg of 40° C.

[Surfactant]
  Silicone-based surfactant: WET-270, obtained from Evonik Industries AG
  Silicone-based surfactant: SAG503A, obtained from Nissin Chemical Co., Ltd.
  Olefin-based surfactant: OLEFIN EXP.4300 (registered trademark), obtained from Nissin Chemical Co., Ltd.

[Solvent]
  1,2-Propanediol, with a boiling point of 187° C.
  3-Methoxy-3-methyl-1-butanol, with a boiling point of 174° C.
  Glycerin, with a boiling point of 290° C.

Examples 1 to 17 and Comparative Examples 1 to 6

Using the prepared inks and processing fluids in the combinations presented in Tables 6 to 9, "discharging stability of the processing fluid" and "adhesiveness" of an image obtained were evaluated.

<Discharging Stability of Processing Fluid>

An inkjet printer (apparatus name: IPSION GXE5500 remodeled apparatus, obtained from Ricoh Company, Ltd.) was filled with the prepared processing fluid. After decapping, discharging stability of the processing fluid was evaluated.

First, in an environment at 25° C. and 30% RH, "head cleaning" was executed from the maintenance commands of the printer, and a test chart was printed, to confirm that all channels of the nozzles were in a discharging state.

Next, the head was left to stand in a decapped state for 5 minutes, and a test chart was printed again. The number of channels that had failed to discharge was counted from the test charts before and after the head was left to stand, and the counted number of channels was evaluated according to the criteria described below. The processing fluid is practically usable when the number of channels that had failed to discharge was less than 10 (when the evaluation was AA and A).

Evaluation Criteria

AA: The number of channels that had failed to discharge was 1 or less.
A: The number of channels that had failed to discharge was 2 or greater but less than 10.
B: The number of channels that had failed to discharge was 10 or greater but less than 20.
C: The number of channels that had failed to discharge was 20 or greater.

<Adhesiveness>

An inkjet printer (apparatus name: IPSIO GXE5500 remodeled apparatus, obtained from Ricoh Company, Ltd.) was filled with the processing fluid.

With the volume of one droplet of the processing fluid set to 21 pL, a half-tone image (processing fluid) was printed on a PET substrate (obtained from HiFi Industrial Film Limited) at a resolution of 600×600 dpi at a printing ratio of from 10% through 90%.

Subsequently, the printed matter was passed through a hot air drying unit at 70° C., to dry and fix the image (processing fluid).

Next, an ink was applied to the PET substrate on which the image (processing fluid) was printed, to print an image. With the volume of one droplet of the ink set to 21 pL, a color solid image was printed at a resolution of 600×600 dpi at a 100% gradation. Subsequently, the printed matter was passed through a hot air drying unit at 70° C., to dry and fixe the image (ink).

According to a cross-cut peeling test using a fabric adhesive tape (obtained from Nichiban Co., Ltd., 123LW-50), the number of grid squares kept remaining on the solid image formed on the PET print medium out of a hundred test grid squares was counted, to evaluate "adhesiveness" with the print medium according to the evaluation criteria described below. The grades B, A, and AA are desirable for practical use.

Evaluation Criteria

AA: The number of remaining grid squares was 98 or greater.
A: The number of remaining grid squares was 90 or greater but less than 98.
B: The number of remaining grid squares was 70 or greater but less than 90.
C: The number of remaining grid squares was less than 70.

TABLE 6

|  |  | Ex. | | | | | |
| --- | --- | --- | --- | --- | --- | --- | --- |
|  |  | 1 | 2 | 3 | 4 | 5 | 6 |
| Processing fluid No. | | Processing fluid 1 | Processing fluid 1 | Processing fluid 1 | Processing fluid 1 | Processing fluid 1 | Processing fluid 1 |
| Ink No. | | Ink 1 | Ink 2 | Ink 3 | Ink 4 | Ink 5 | Ink 6 |
| Evaluation result | Dischargeability | AA | AA | AA | AA | AA | AA |
|  | Adhesiveness | AA | AA | AA | AA | AA | AA |

TABLE 7

|  |  | Ex. | | | | | |
| --- | --- | --- | --- | --- | --- | --- | --- |
|  |  | 7 | 8 | 9 | 10 | 11 | 12 |
| Processing fluid No. | | Processing fluid 2 | Processing fluid 3 | Processing fluid 4 | Processing fluid 5 | Processing fluid 6 | Processing fluid 7 |
| Ink No. | | Ink 2 | Ink 2 | Ink 2 | Ink 2 | Ink 2 | Ink 2 |
| Evaluation result | Dischargeability | AA | AA | AA | AA | AA | A |
|  | Adhesiveness | AA | AA | AA | AA | A | AA |

TABLE 8

|  |  | Ex. | | | | |
| --- | --- | --- | --- | --- | --- | --- |
|  |  | 13 | 14 | 15 | 16 | 17 |
| Processing fluid No. | | Processing fluid 8 | Processing fluid 9 | Processing fluid 10 | Processing fluid 11 | Processing fluid 12 |
| Ink No. | | Ink 2 | Ink 2 | Ink 2 | Ink 2 | Ink 2 |
| Evaluation result | Dischargeability | B | B | B | AA | A |
|  | Adhesiveness | AA | AA | AA | A | A |

TABLE 9

|  |  | Comp. Ex. | | | | | |
| --- | --- | --- | --- | --- | --- | --- | --- |
|  |  | 1 | 2 | 3 | 4 | 5 | 6 |
| Processing fluid No. |  | Processing fluid 13 | Processing fluid 14 | Processing fluid 15 | Processing fluid 16 | Processing fluid 17 | Processing fluid 18 |
| Ink No. |  | Ink 2 | Ink 2 | Ink 2 | Ink 2 | Ink 2 | Ink 2 |
| Evaluation result | Dischargeability | AA | AA | C | A | C | B |
|  | Adhesiveness | C | C | A | C | B | C |

Aspects of the present disclosure are, for example, as follows.

<1> An image forming method, including:
applying a processing fluid containing a multivalent metal salt, a resin $T_A$, a resin $T_B$ different from the resin $T_A$, and a silicone-based surfactant to a non-permeating base material by an inkjet method, the processing fluid being free of an organic solvent having a boiling point of 200° C. or higher at normal pressure; and
applying an ink containing a coloring material, an organic solvent, and a resin onto the processing fluid.

<2> The image forming method according to <1>, wherein a glass transition temperature $Tg_A$ of the resin $T_A$ satisfies Tgn:–15° C., and
a glass transition temperature $Tg_B$ of the resin $T_B$ satisfies 30° C.<Tgs.

<3> The image forming method according to <1> or <2>, wherein the multivalent metal salt contains either or both of a magnesium salt and a calcium salt.

<4> A set of a processing fluid and an ink, the set including:
a processing fluid containing a multivalent metal salt, a resin $T_A$, a resin $T_B$ different from the resin $T_A$, and a silicone-based surfactant, the processing fluid being free of an organic solvent having a boiling point of 200° C. or higher; and
an ink containing a coloring material, an organic solvent, and a resin.

<5> A printed matter producing method, including:
applying a processing fluid containing a multivalent metal salt, a resin $T_A$, a resin $T_B$ different from the resin $T_A$, and a silicone-based surfactant to a non-permeating base material by an inkjet method, the processing fluid being free of an organic solvent having a boiling point of 200° C. or higher at normal pressure; and applying an ink containing a coloring material, an organic solvent, and a resin onto the processing fluid.

<6> An image forming apparatus, including:
a processing fluid storage storing a processing fluid containing a multivalent metal salt, a resin $T_A$, a resin $T_B$ different from the resin $T_A$, and a silicone-based surfactant, the processing fluid being free of an organic solvent having a boiling point of 200° C. or higher at normal pressure;
a processing fluid applying unit configured to apply the processing fluid stored in the processing fluid storage to a non-permeating base material by an inkjet method;
an ink storage storing an ink containing a coloring material, an organic solvent, and a resin; and
an ink applying unit configured to apply the ink stored in the ink storage onto the processing fluid.

The image forming method according to any one of <1> to <3>, the set of a processing fluid and an ink according to <4>, the printed matter producing method according to <5>, and the image forming apparatus according to <6> can solve the various problems in the related art and achieve the object of the present disclosure.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. An image forming method, comprising:
applying a processing fluid containing a multivalent metal salt, a resin $T_A$, a resin $T_B$ different from the resin $T_A$, and a silicone-based surfactant to a non-permeating base material by an inkjet method, the processing fluid having a content ratio of 1% by mass or less of an organic solvent having a boiling point of 200° C. or higher at normal pressure; and
applying an ink containing a coloring material, an organic solvent, and a resin onto the processing fluid,
wherein the non-permeating base material has a water-absorption amount of 10 mL/m$^2$ or less between the contact and 30 msec$^{1/2}$ after the contact according to the Bristow method.

2. The image forming method according to claim 1, wherein a glass transition temperature $Tg_A$ of the resin $T_A$ satisfies $Tg_A \leq -15°$ C., and
a glass transition temperature $Tg_B$ of the resin $T_B$ satisfies $30°$ C.$\leq Tg_B$.

3. The image forming method according to claim 1, wherein the multivalent metal salt contains either or both of a magnesium salt and a calcium salt.

4. A set of a processing fluid and an ink, the set comprising:
a processing fluid containing a multivalent metal salt, a resin $T_A$, a resin $T_B$ different from the resin $T_A$, and a silicone-based surfactant, the processing fluid having a content ratio of 1% by mass or less being-free of an organic solvent having a boiling point of 200° C. or higher; and
an ink containing a coloring material, an organic solvent, and a resin.

5. An image forming apparatus, comprising:
a processing fluid storage storing a processing fluid containing a multivalent metal salt, a resin $T_A$, a resin $T_B$ different from the resin $T_A$, and a silicone-based surfactant, the processing fluid having a content ratio of 1% by mass or less being-free of an organic solvent having a boiling point of 200° C. or higher at normal pressure;

a processing fluid applying unit configured to apply the processing fluid stored in the processing fluid storage to a non-permeating base material by an inkjet method, wherein the non-permeating base material has a water-absorption amount of 10 mL/m$^2$ or less between the contact and 30 msec$^{1/2}$ after the contact according to the Bristow method;

an ink storage storing an ink containing a coloring material, an organic solvent, and a resin; and an ink applying unit configured to apply the ink stored in the ink storage onto the processing fluid.

* * * * *